(12) United States Patent
Gottlieb

(10) Patent No.: US 6,532,672 B1
(45) Date of Patent: Mar. 18, 2003

(54) AREA MEASUREMENT DEVICE AND METHOD

(75) Inventor: Joseph S. Gottlieb, 1803 Summit Dr., Escondido, CA (US) 92027

(73) Assignee: Joseph S. Gottlieb, Escondido, CA (US)

( * ) Notice: Subject to any disclaimer, the term of this patent is extended or adjusted under 35 U.S.C. 154(b) by 0 days.

(21) Appl. No.: 09/540,609

(22) Filed: Mar. 31, 2000

(51) Int. Cl.$^7$ .......................... G01B 5/26; G01B 5/004; G01B 21/28

(52) U.S. Cl. .................... 33/124; 33/781; 702/156

(58) Field of Search ........................... 33/121–124, 772, 33/773, 779, 780, 781, 782, 1 C, 1 U, 1 AA, 1 MP; 702/156; 700/218, 214, 216, 228, 135, 195, 303

(56) References Cited

U.S. PATENT DOCUMENTS

| | | | |
|---|---|---|---|
| 2,770,044 A * | 11/1956 | Wood | 33/121 |
| 2,802,272 A * | 8/1957 | Martin et al. | 33/123 |
| 3,121,956 A * | 2/1964 | Philbin | 33/121 |
| 3,355,942 A * | 12/1967 | Freeman | 73/178 R |
| 3,571,932 A * | 3/1971 | Peddie | 33/123 |
| 3,733,434 A * | 5/1973 | Weinstein | 348/170 |
| 3,832,687 A * | 8/1974 | Miller et al. | 382/193 |
| 3,871,235 A * | 3/1975 | Anderson | 73/510 |
| 3,980,870 A * | 9/1976 | Kawahara | 382/296 |
| 4,127,941 A * | 12/1978 | Hoover | 33/1 C |
| 4,156,231 A * | 5/1979 | Edamatsu et al. | 382/206 |
| 4,184,261 A * | 1/1980 | Buerner | 33/18.1 |
| 4,242,804 A | 1/1981 | Buerner | 33/438 |
| 4,480,310 A * | 10/1984 | Alvarez | 701/217 |
| 4,528,754 A * | 7/1985 | Houldsworth | 33/18.1 |
| 4,616,419 A | 10/1986 | Kubo | 33/122 |
| 4,617,740 A | 10/1986 | Mikio | 33/122 |
| 4,713,782 A * | 12/1987 | Blackham | 702/109 |
| 4,788,773 A * | 12/1988 | Palsgard et al. | 33/333 |
| 4,945,650 A * | 8/1990 | Hird | 33/763 |
| 5,038,484 A * | 8/1991 | Rench et al. | 33/124 |
| 5,042,164 A * | 8/1991 | Eppinger | 33/561.2 |
| 5,161,313 A * | 11/1992 | Rijlaarsadam | 33/773 |
| 5,174,030 A | 12/1992 | Clot et al. | 33/3 C |
| 5,428,449 A | 6/1995 | Goldsmith et al. | 356/635 |
| 5,477,622 A * | 12/1995 | Skalnik | 33/781 |
| 5,515,299 A * | 5/1996 | Kaji et al. | 702/169 |
| 5,560,119 A * | 10/1996 | LeBreton | 33/773 |
| 5,583,541 A * | 12/1996 | Solhjell | 345/163 |
| 5,625,827 A * | 4/1997 | Krause et al. | 707/502 |
| 5,697,162 A * | 12/1997 | Bornand et al. | 33/352 |
| 5,727,329 A | 3/1998 | Kubo | 33/773 |
| 5,748,502 A | 5/1998 | Kubo et al. | 702/95 |
| 5,780,846 A * | 7/1998 | Angilella et al. | 250/227.21 |
| 5,875,556 A | 3/1999 | Kubo et al. | 33/123 |
| 5,883,861 A * | 3/1999 | Moser et al. | 368/10 |
| 5,899,702 A | 5/1999 | Nuttall et al. | 438/14 |
| 5,902,968 A * | 5/1999 | Sato et al. | 178/19.01 |
| 5,903,228 A * | 5/1999 | Oligaki et al. | 340/995 |
| 5,943,785 A * | 8/1999 | Kondo | 33/773 |
| 2002/0124424 A1 * | 9/2002 | Airey et al. | 33/320 |
| 2002/0129505 A1 * | 9/2002 | Airey et al. | 33/320 |

\* cited by examiner

*Primary Examiner*—Diego Gutierrez
*Assistant Examiner*—R. Alexander Smith
(74) *Attorney, Agent, or Firm*—Brinks Hofer Gilson & Lione

(57) ABSTRACT

An area measurement device having a support to be moved around a boundary. A direction indicator determines the directional orientation of the support and creates direction data. A distance indicator determines the distance traveled by the support and creates distance data. A microprocessor receives the direction data and distance data and calculates the area inside the boundary based on this data.

33 Claims, 9 Drawing Sheets

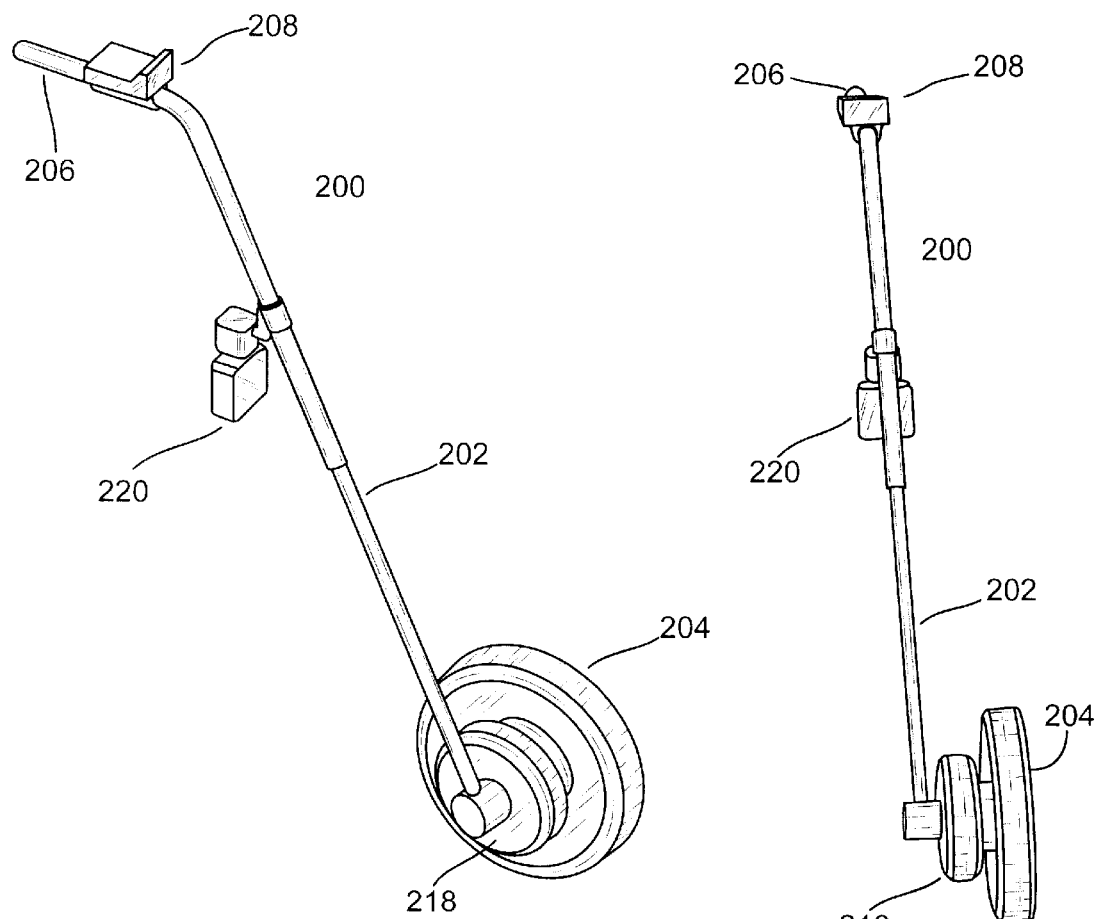
FIG. 2A
FIG. 2B
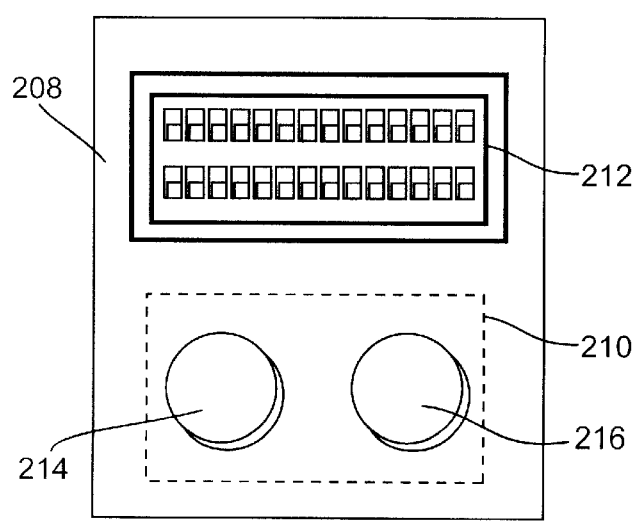
FIG. 2C

AREA MEASUREMENT DEVICE AND METHOD

BACKGROUND OF THE INVENTION

The present invention relates to a device and method for measuring an area, particularly adapted to measure areas with complicated geometries.

There are numerous situations in which the area inside a boundary must be determined. For instance, the area of a driveway must be determined to estimate the amount of concrete required for a new pavement. Likewise, the area of a room must be determined before it may be carpeted.

Methods and devices exist for measuring an area in such situations. For example, one such device is intended to measure distances and includes a wheel attached to a support. The wheel may be rolled from one point to another point to determine the distance between the points. A counter associated with the wheel tracks the number of revolutions. This number, multiplied by the circumference of the wheel, yields the distance traveled. This device may be used to measure the area inside a rectangle. First, the device is used to determine the length and width of the rectangle. These two lengths are then multiplied to determine the area. This process is inconvenient, however, in that it includes multiple steps and requires the user of the device to calculate the area manually. Furthermore, to calculate the area inside shapes more complicated than a rectangle, the measurements and calculations involved quickly become unwieldy.

Another device exists that can automatically measure the area of a rectangular room. When placed in the corner of the room, the device uses reflected laser beams to determine the distance to each of the two opposing walls. The device then automatically multiplies these two distances to calculate the area of the room. This device is limited, however, in that the area to be measured must be rectangular and must be bounded on at least two sides by walls.

Another conceivable approach to measuring an area is to use a global positioning system (GPS) to plot the boundary of the area. Once the boundary is plotted, an algorithm may be used to calculate the area inside the boundary. However, current commercially-available GPS transceivers are only accurate to within approximately one meter. This margin of error applies to each boundary point plotted. The total margin of error would be multiplied when the boundary points are used to calculate the area inside the boundary. Accordingly, a conventional GPS-based system is acceptable only for measuring very large areas for which the margin of error produced by the one-meter GPS system resolution is not significant.

An alternative to conventional GPS is differential GPS. Differential GPS uses fixed ground stations to determine location more precisely, thereby achieving a reduced margin of error compared to that of conventional GPS. However, differential GPS is prohibitively expensive for use in many area-measurement projects.

There is therefore a need for an area measurement device that provides for convenient measurement of the area within a boundary. There is a further need for an area measurement device that is capable of conveniently measuring the area inside irregularly shaped boundaries. There is also a need for an area measurement device that is capable of conveniently measuring an area that is not bounded by walls or other structures.

BRIEF SUMMARY OF THE PREFERRED EMBODIMENTS

According to one aspect of the present invention, the foregoing needs are addressed by a system for measuring the area inside a boundary. The system includes a support that may be moved around the boundary. A direction indicator is provided to determine the directional orientation of the support. The direction indicator is configured to create direction data as the support is moved around the boundary. A distance indicator is also provided. The distance indicator determines the distance traveled by the support and creates distance data as the support is moved around the boundary. A microprocessor is programmed to receive the direction and distance data and to use this data to calculate the area inside the boundary.

According to another aspect of the present invention, a system for measuring the area inside a closed boundary includes two wheels. The wheels are mounted to a support and may be rolled around the boundary. Distance indicators determine the distance traveled by each wheel and create distance data for each wheel as the support is moved around the boundary. A microprocessor is programmed to receive the distance data for each wheel from the distance indicators. The microprocessor compares the distance data for the two wheels to determine the distance traveled by the support and to create support distance data. The microprocessor also compares the distance data for the two wheels to determine the directional orientation of the support as it is moved around the boundary and to create direction data. The microprocessor is programmed to use the support distance data and the direction data to calculate the area inside the boundary.

According to a further aspect of the present invention, a system for measuring the area inside a closed boundary includes a rotatable ball that may be rolled around the boundary. As the ball is rolled around the boundary, X-Y position indicators convert the rotation of the ball into position data. A microprocessor is programmed to receive the position data and to calculate the area inside the boundary using this data.

According to a still further aspect of the present invention, a method may be used to measure the area inside a boundary. A support is moved around the boundary. The directional orientation of the support is determined at a number of positions along the boundary. The distance traveled by the support is also determined at a number of positions along the boundary. Direction data and distance data are created for each of the positions. The area inside the boundary is then calculated based upon this data.

Advantages of the present invention will become readily apparent to those skilled in the art from the following description of the preferred embodiments of the invention that have been shown and described by way of illustration. As will be realized, the invention is capable of other and different embodiments, and its details are capable of modification in various respects. Accordingly, the drawings and description are to be regarded as illustrative in nature, and not as restrictive.

BRIEF DESCRIPTION OF THE DRAWINGS

FIGS. 2A and 2B are elevational views of an area measurement device according to another presently preferred embodiment of the present invention.

FIG. 2C is an elevational view of a user interface for use with an area measurement device such as the one depicted in FIGS. 2A and 2B.

DETAILED DESCRIPTION OF THE PREFERRED EMBODIMENTS

Figure 1:
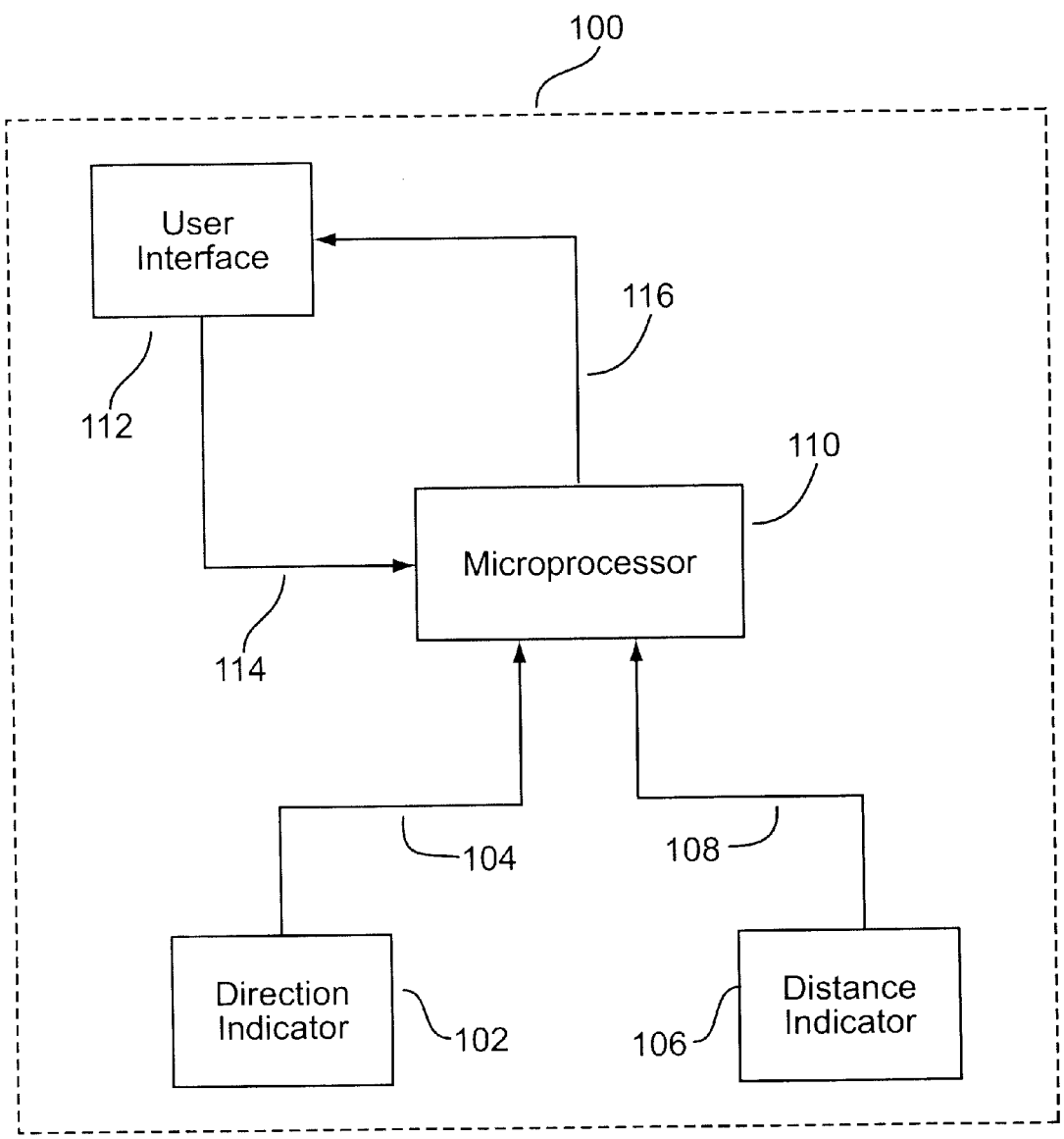
FIG. 1 is a block diagram of an area measurement system according to one presently preferred embodiment of the present invention.

Turning now to the drawings, wherein like numerals designate like components, FIG. 1 is a block diagram of an area measurement system 100 according to one presently preferred embodiment of the present invention. The system 100 is part of a device that may be moved around a boundary to determine the area within the boundary. A direction indicator 102 determines the directional orientation of the device and creates direction data 104 as the device is moved around the boundary. The direction indicator 102 may be a compass, a gyroscope, or the like. Other suitable components for monitoring directional orientation are known in the art.

A distance indicator 106 determines the distance traveled by the device and creates distance data 108 as the device is moved around the boundary. The distance indicator 106 may be a wheel and disc encoder, a laser/reflector sweep tracking system, or the like. Other suitable components for monitoring a distance traveled are known in the art.

A microprocessor 110 is programmed to receive the direction data 104 and distance data 108 and to use this data to calculate the area inside the boundary. As used herein, the term "a microprocessor" means a programmable processor or dedicated circuitry. A user interface 112 is provided to allow the user control over the system. In response to user input, the user interface 112 sends instructions to the microprocessor 110 in the form of input data 114. In turn, the microprocessor 110 sends output data 116 to the user interface 112. The output data 116 may comprise user prompt information, status information, and/or the results of the area calculation.

Optionally, the system 100 also may be configured to include a mode for measuring distance. In area mode, the system 100 measures the area inside a boundary as described above. In distance mode, the system 100 simply measures the distance between two points.

FIGS. 2A and 2B are elevational views of an area measurement device 200 incorporating one presently preferred embodiment of the system 100 of FIG. 1. The device 200 includes a support 202, such as a frame or a housing. A wheel 204 is rotatably connected to the support 202. The support 202 may be moved around a boundary by pushing or pulling the support 202 such that the wheel 204 rolls along the boundary. Optionally, a grip or handle 206 may be provided for convenient handling of the area measurement device 200.

An input/output module 208 serves as the user interface 112. The user of the area measurement device 200 inputs instructions and receives system output through the input/output module 208. As shown in FIG. 2C, the input/output module 208 may include an input device 210, such as a keypad, and an output device 212, such as a display.

The input device 210 may include one or more buttons. For instance, the input device 210 may include a first button 214 and a second button 216. The system 100 may be configured such that the first button 214 functions as a start/stop button, and the second button 216 functions as a select button. The start/stop button 214 is used to start or stop the measurement process and to make selections from a menu. The select button 216 is used to change the selection in the menu. For example, a menu allows the user to select either area or distance mode. The user presses the select button 216 to select one of the two modes. The user then presses the start/stop button 214 to enter the selected mode. After selecting a mode, the user presses the start/stop button 214 a second time to begin the measurement process, and a third time to end the measurement process. The user then receives the measurement results through the output device 212.

Returning to FIGS. 2A and 2B, a disc encoder 218 is shown. The disc encoder 218 serves as a distance indicator 106. The disc encoder 218 may be mounted on the support 202 adjacent to the wheel 204. The disc encoder 218 includes a thin disc with a number of holes at equal distances around its periphery. The disc is rotationally coupled to the wheel 204, such that when the wheel 204 spins, the disc spins at the same rate. The disc encoder also includes an optical sensor such as the EE-SX4009-P1 manufactured by Omron Corporation. The optical sensor senses light passing through the peripheral holes in the disc. As the disc rotates with the wheel 204, the optical sensor senses the movement of the peripheral holes in the disc, and produces an electronic signal indicative of the rotational movement of the wheel 204. This signal is sent to the microprocessor 110 as distance data 108.

An electronic compass 220 functions as a direction indicator 102. The electronic compass 220 may be one such as the Vector 2X or the Vector 2XG, both manufactured by Precision Navigation, Inc. As shown in FIGS. 2A and 2B, the compass 220 may be mounted on the support 202. Alternatively, the compass 220 may be housed within the input/output module 208, or mounted in another convenient location on the measurement device 200. The compass 220 also may be gimbaled to maintain the compass 220 in a horizontally level position.

The compass 220 is configured to sense the directional orientation of the area measurement device 200 and to produce an electronic signal indicative of the directional orientation. The compass 220 sends this signal to the microprocessor 110 as direction data 104.

The microprocessor 110 may be housed in any convenient location on the measurement device 200. Alternatively, the microprocessor 110 may be an external processing device such as a personal computer or palm-sized computing device. In this case, the direction and distance data 104, 108 are collected into a data storage unit included with the measurement device 200. After the data is collected, it is imported into the external processing device, which calculates the area based on the imported data.

Figure 3:
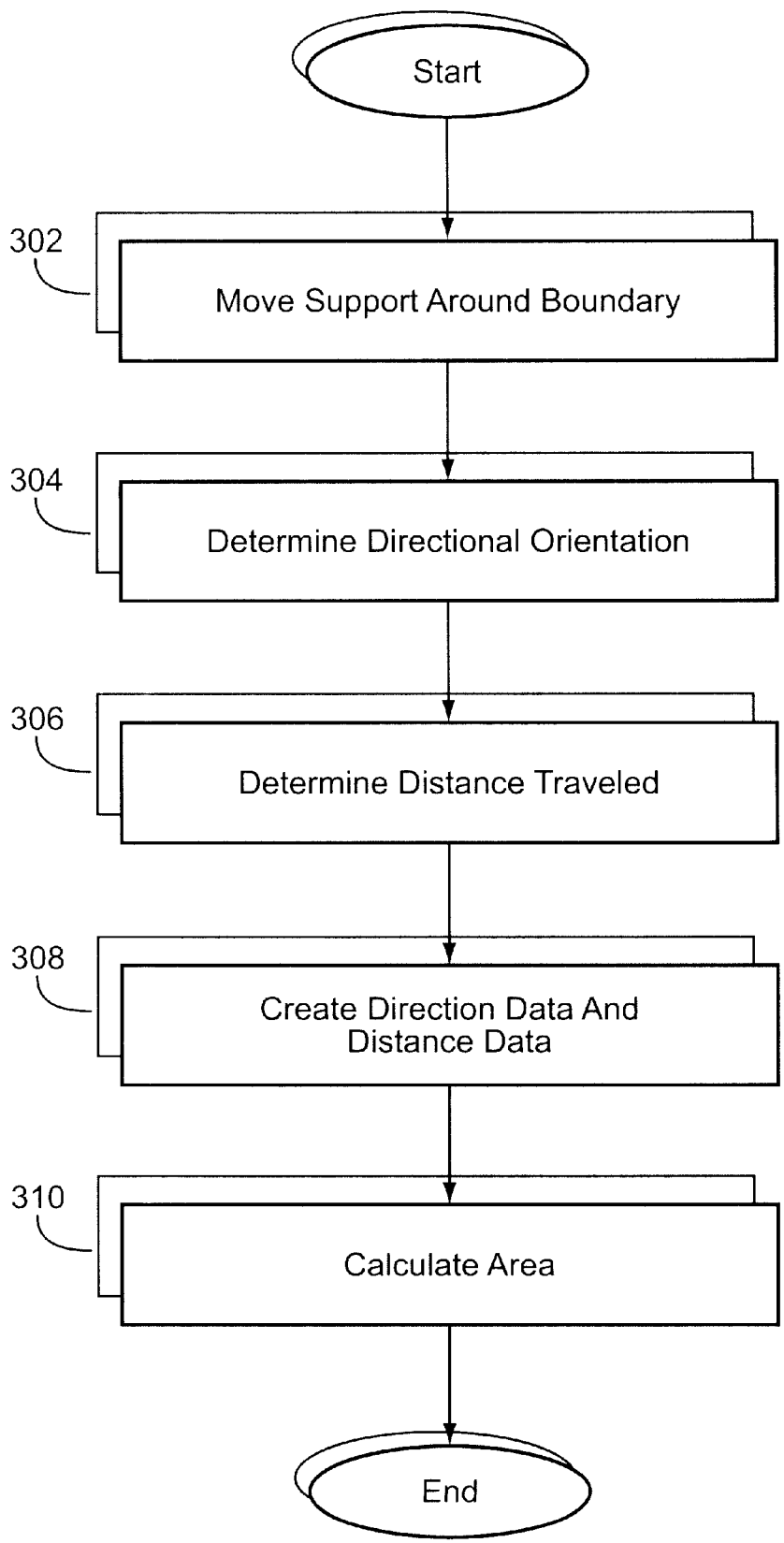
FIG. 3 is a flowchart depicting one presently preferred method of measuring the area within a boundary according to the present invention.

FIG. 3 is a flowchart depicting one presently preferred method of measuring the area within a boundary according to the present invention. To measure the area, the first step 302 is to move the device 200 around the boundary. The second step 304 is to determine the directional orientation of the device 200 at various positions along the boundary. In a similar fashion, the third step 306 is to determine the distance traveled by the device at various positions along the boundary. The fourth step 308 is to create direction data 104 and distance data 108 for each of the various boundary positions. The fifth step 310 is to calculate the area inside the boundary based upon the direction data 104 and the distance data 108.

Step 304, determining directional orientation, and step 306, determining distance traveled, are generally completed on a discrete basis. The directional orientation and distance traveled are sampled at periodic intervals. The sampled data becomes part of the direction data 104 and the distance data 108, respectively. The rate of periodic sampling may be determined in a number of ways. For instance, the sampling rate may be periodic in time. In this case, the system is driven by a clock, and a certain number of data samples are taken in a particular time period. Alternatively, the sampling rate may be periodic in distance traveled. In this case, the system is driven by the output signal of the disc encoder 218 or other distance indicator, and a certain number of data samples are taken as the measurement device travels over a certain distance. In each case, the accuracy of the measurement system increases with the sampling rate.

A third alternative for determining sampling rate is to drive the system with the output of the electronic compass 220 or other direction indicator. This alternative is useful because the electronic compass 220 requires a discrete amount of time to take a single sample of directional orientation. The output rate of the compass 220 is limited by this requirement. If the compass 220 is polled too frequently for direction data samples, the data may not accurately reflect the directional orientation at a given time. This problem may be solved by configuring the compass 220 to drive the measurement system 100. The compass 220 is programmed to output direction data samples to the microprocessor 110 at a rate that preserves data accuracy. The microprocessor 110, in turn, is programmed to poll the encoder wheel 218 for a distance data sample each time a direction data sample is received from the compass 220. In this way, the compass 220 drives the measurement system 100, and accuracy of direction data is maintained. For the Vector 2X and Vector 2XG models described above, a presently preferred sampling rate is about 4 to 5 Hz.

Figure 4A:
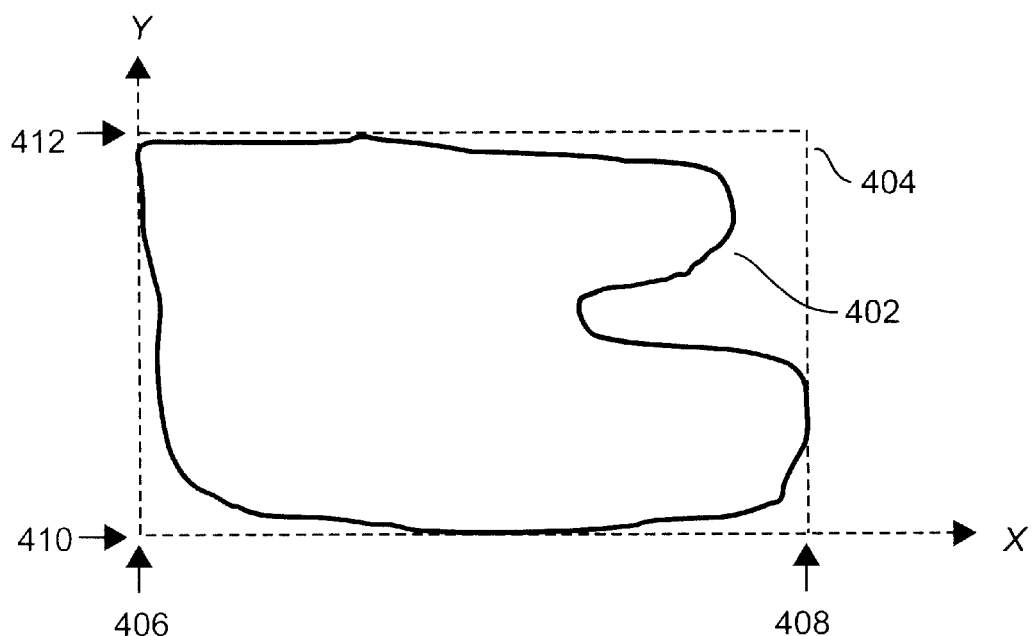
FIG. 4a is a diagram depicting a boundary mapped onto a Cartesian coordinate system.

Once the direction data 104 and distance data 108 have been collected, an algorithm may be used to calculate the area inside the boundary they define. First, the direction data 104 and the distance data 108 are used to map the boundary onto a Cartesian coordinate system, as shown in FIG. 4A. This requires converting the polar coordinates contained in the direction data 104 and distance data 108 into rectangular coordinates through commonly known methods. Then, as the points on the boundary 402 are mapped, they are quantized to coincide with coordinates on the Cartesian system.

Once the boundary 402 has been mapped, a maximum square area 404 may be determined. The maximum square area 404 is defined by the following extreme values occupied by the boundary 402 on the coordinate system: min-X 406, max-X 408, min-Y 410, and max-Y 412. The maximum square area 404 may be calculated by multiplying the difference between min-X 406 and max-X 408 by the difference between min-Y 410 and max-Y 412.

Figure 4B:
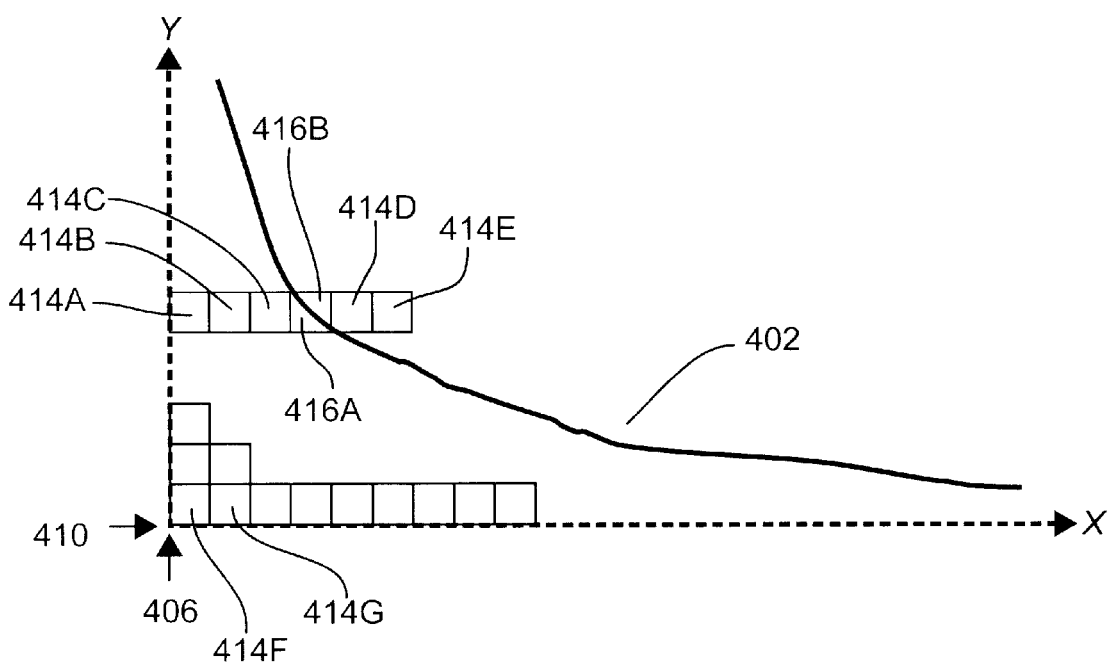
FIG. 4b is an enlarged diagram depicting a portion of a boundary mapped onto a Cartesian coordinate system.

As shown in FIG. 4B, the maximum square area 404 may be divided into elements 414, defined at their corners by the coordinates on the Cartesian system. The algorithm calculates the area inside the boundary 402 by determining the total number of elements 414 that are inside the boundary 402. To arrive at this number, the algorithm begins by creating a value, referred to as the running total. Initially, the running total is set equal to the total number of elements 414 that are contained within the maximum square area 404. As the algorithm proceeds, it subtracts the number of elements 414A–C that are within the maximum square area 404 but not within the boundary 402.

The algorithm begins at the first element 414F, defined by the coordinates min-X 406, min-Y 410, and moves from element 414F to element 414G, determining whether each element 414 is inside or outside the boundary. If the element 414 is outside the boundary 402, the running total is decreased by one unit; if the element 414 is inside the boundary 402, the running total is not decreased. If one half 416A of the element 414 is outside the boundary and the other half 416B is inside the boundary, the running total is decreased by one half unit. The algorithm continues from left to right, bottom to top, until it has analyzed all of the elements 414 and arrived at the position defined by the coordinates max-X 408, max-Y 412. The running total at this point is equal to the area inside the boundary 402 in square units.

Figure 5:
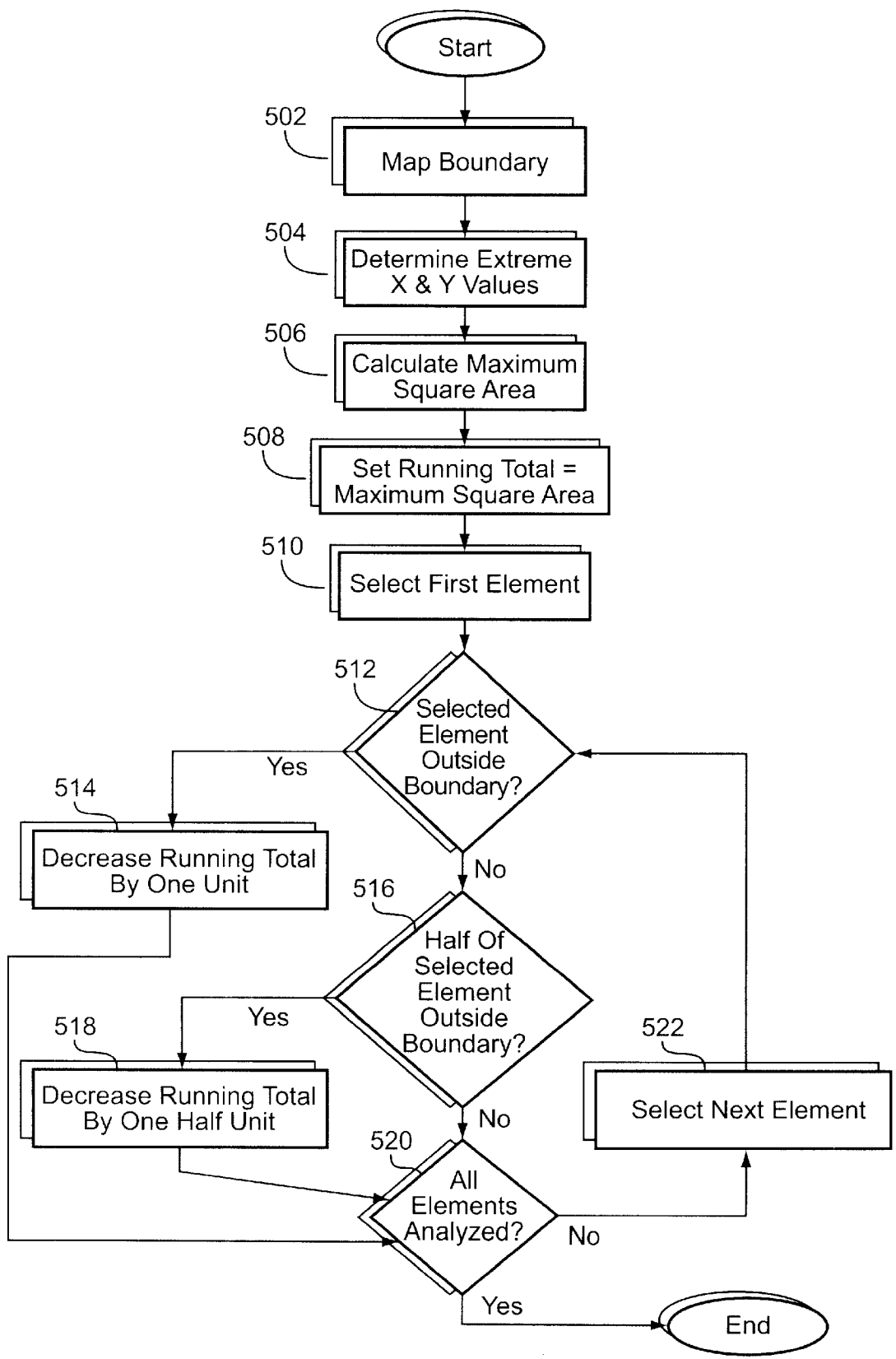
FIG. 5 is a flowchart depicting one presently preferred method of calculating the area within a boundary according to the present invention.

FIG. 5 is a flowchart depicting the algorithm described above. At step 502, the boundary 402 is mapped onto a Cartesian coordinate system. In this step 502, the points along the boundary 402 are quantized to coincide with the coordinates of the Cartesian system. The next step 504 is to determine the extreme X and Y values (min-X 406, max-X 408, min-Y 410, and max-Y 412) occupied by the boundary 402 on the coordinate system. Then, in step 506, the maximum square area 404 is determined by multiplying the difference between max-X 408 and min-X 406 by the difference between max-Y 412 and min-Y 410. In step 508, a running total is created and set equal to the maximum square area 404.

The next step 510 is to select the first element 414F, defined by the coordinates min-X 406, min-Y 410, for analysis. At step 512, the selected element 414 is analyzed to determine whether it is outside the boundary 402. If the selected element 414 is outside the boundary 402, the running total is decreased by one unit in step 514. The algorithm then continues to step 520. If, however, the selected element 414 is determined not to be outside the boundary in step 512, the algorithm proceeds to step 516 and determines whether one half 416 of the element 414 is outside the boundary. If one half 416 of the selected element 414 is outside the boundary, the running total is decreased by one half unit at step 518. The algorithm then continues to step 520. If, however, the selected element 414 is determined to be entirely within the boundary in step 516, the algorithm proceeds directly to step 520.

The next step 520 is to determine whether all of the elements 414 in the maximum square area 404 have been analyzed. If all elements 414 have been analyzed, the algorithm ends. However, if all of the elements 414 have not been analyzed, the next sequential element 414 is selected in step 522, and the algorithm returns to step 512 and repeats. The algorithm continues in this manner until all the elements 414 in the maximum square area 404 have been analyzed. When the algorithm ends, the running total is equal to the area inside the boundary 402 in square units. This number may be converted to square feet, square meters, or other convenient units of measure, through multiplication by a conversion factor.

The algorithm described above requires that the boundary 402 be closed. In other words, in moving the device around the boundary 402, the device 200 must always be returned to its starting point to close the boundary 402. This limitation may be avoided by changing the algorithm to close the boundary 402 automatically. For instance, the boundary 402 may be checked to determine whether it is closed. If the boundary 402 is not closed, the starting and ending points may be connected in some manner by default. For example, the starting and ending points may be connected by a straight line to close the boundary 402. With the boundary 402 closed, the algorithm would then proceed to determine the area within the boundary 402.

In addition to the area measurement device depicted in FIGS. 2A and 2B, the present invention may be embodied in other devices capable of measuring the area within a closed boundary 402. For instance, the device 600 shown in FIGS. 6A and 6B includes two wheels 604A,B and determines directional orientation by comparing the relative distances traveled by the two wheels 604A,B. As with the previously described device 200, this device 600 includes a handle 606 and an input/output module 608. A microprocessor 110 is included and may be housed within the input/output module 608.

This device 600 includes a disc encoder 618A,B for each wheel 604A,B. Each disc encoder 618A,B contains a disc and an optical sensor as described above, and is configured to sense optically the rotational movement of the corresponding wheel 604A,B. In response to the movement of the each wheel 604A,B, the associated disc encoder 618A,B sends wheel distance data to the microprocessor 110 in the form of an electronic signal produced by the optical sensor.

Figure 6:
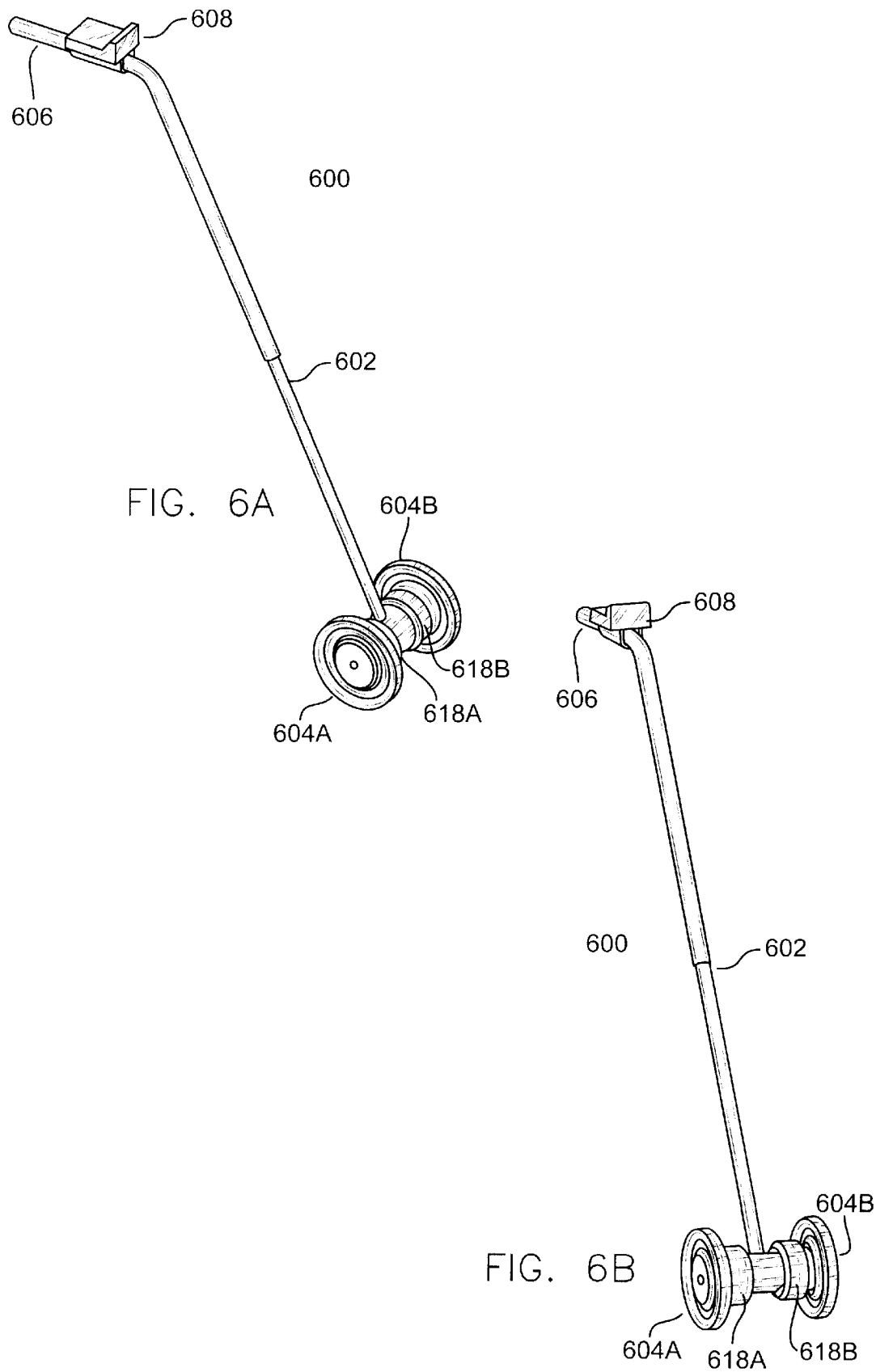
FIGS. 6A and 6B are elevational views of another area measurement device according to another presently preferred embodiment of the present invention.
Figure 7:
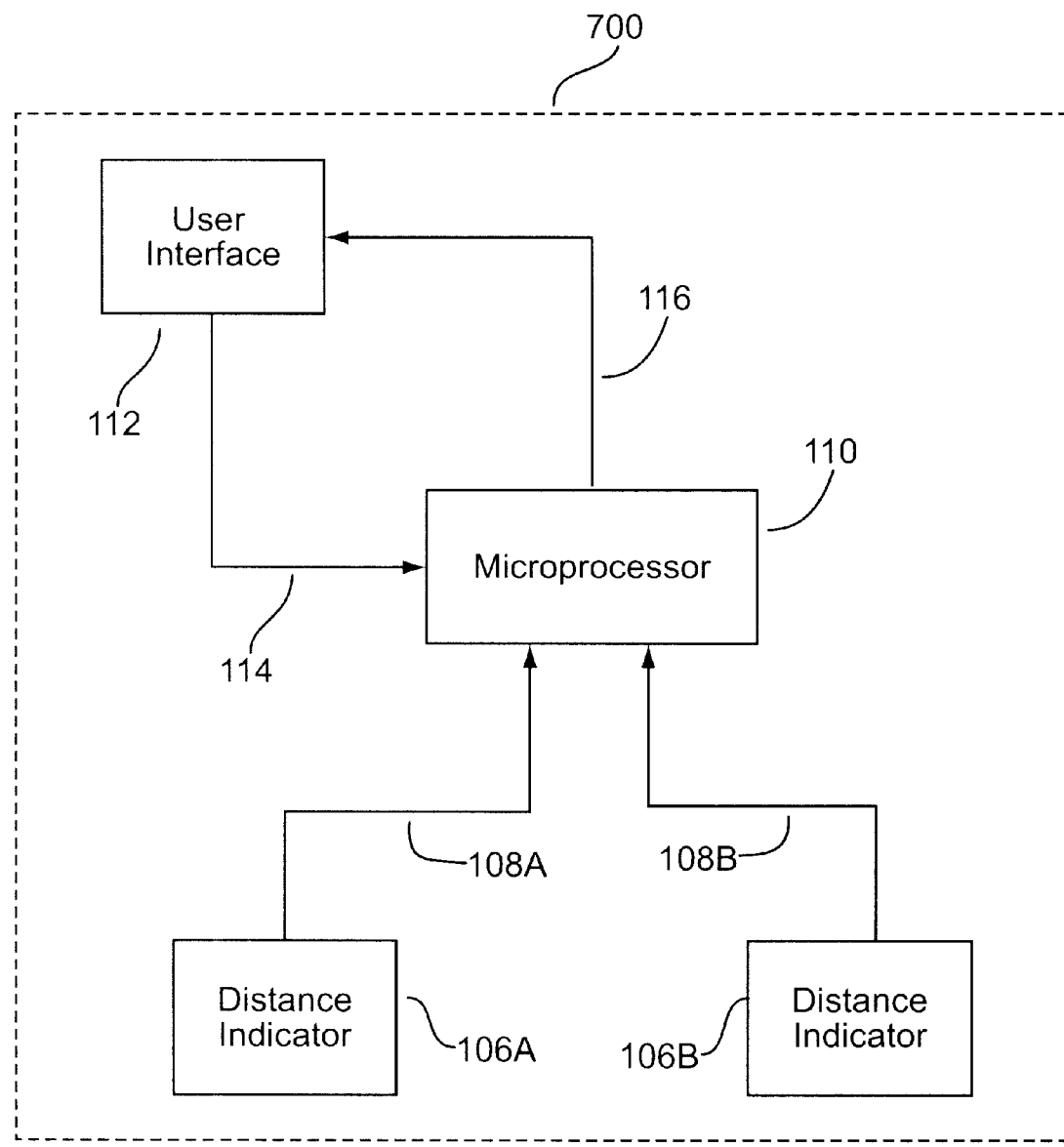
FIG. 7 is a block diagram of one presently preferred area measurement system for use with the area measurement device of FIGS. 6A and 6B.

FIG. 7 is a block diagram of an area measurement system for use with the device 600 in FIGS. 6A and 6B. To measure the area inside a boundary, the device 600 is moved around the boundary 402. Distance indicators 106A,B, which are represented by the disc encoders 618A,B in FIGS. 6A and 6B, track the distance traveled by each wheel 604A,B and send this information to the microprocessor 110 as first and second wheel distance data 108A,B. From this information, the microprocessor 110 is programmed to determine composite distance data by averaging the first and second wheel distance data 108A,B. The composite distance data represents the distance traveled by the device 600 at various points along the boundary 402. Further, the microprocessor 110 is programmed to determine the directional orientation of the device 600 at various points along the boundary 402 by comparing the distances traveled by each wheel 604A,B. This is possible because as the device is steered through a turn in the boundary 402, the outer wheel 604 will travel a greater distance than the inner wheel 604. Using this information, the microprocessor 110 is programmed to map the boundary 402 onto a Cartesian coordinate system and to calculate the area inside the boundary 402 as described above.

Figures 8A, 8B:
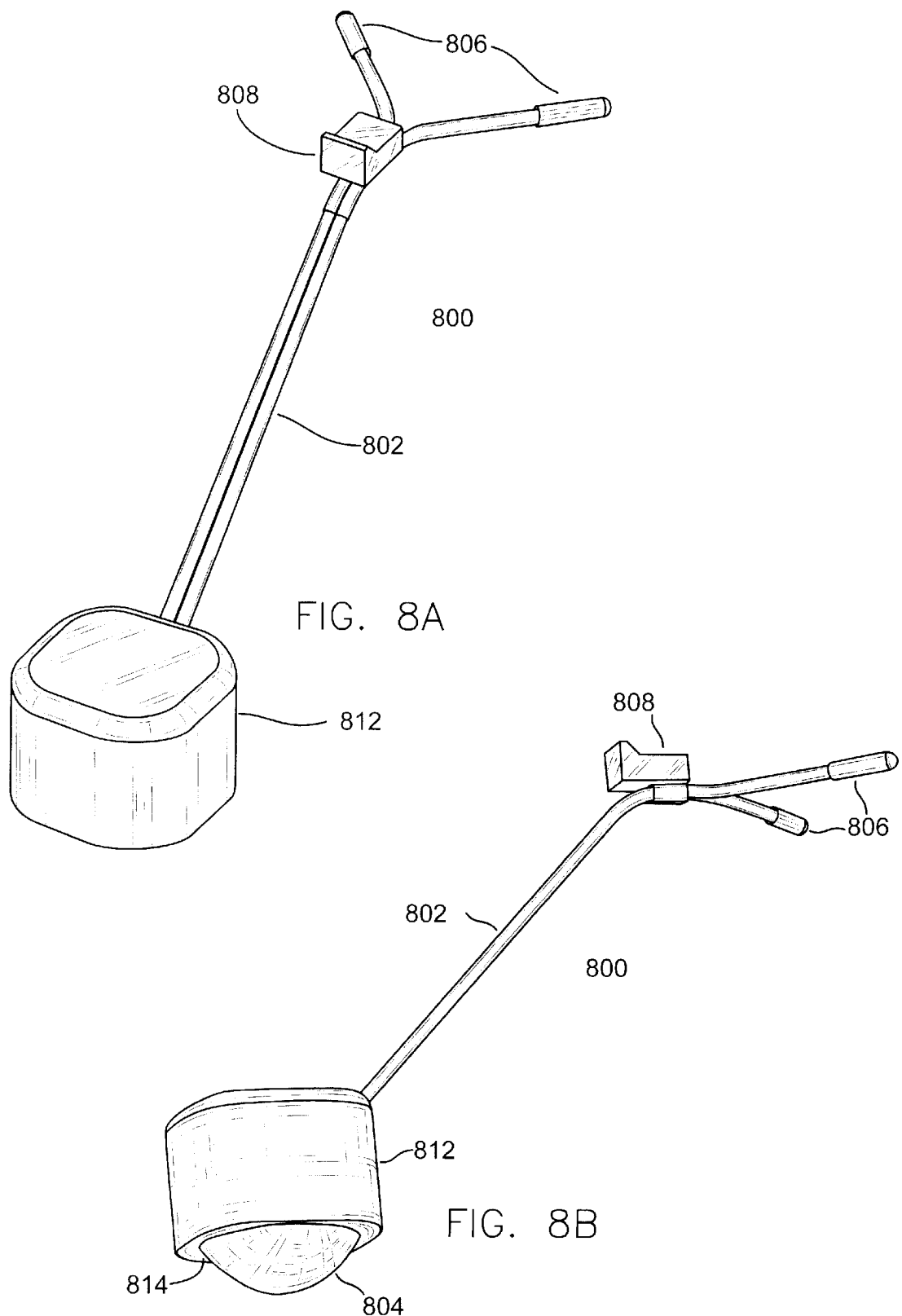
FIGS. 8A and 8B are elevational views of yet another area measurement device according to another presently preferred embodiment of the present invention.

Yet another area measurement device 800 embodying the present invention is shown in FIGS. 8A and 8B. This device 800 includes a support 802 and is moved by way of a rotatable ball 804. The device may include a unitary frame 812 disposed on the support 802, including a domed portion 814 for receiving the ball 802. Like the previous embodiments, the device 800 includes handles 806 and an input/output module 808. A microprocessor 110 is included, and may be housed within the input/output module 808.

Figure 9A:
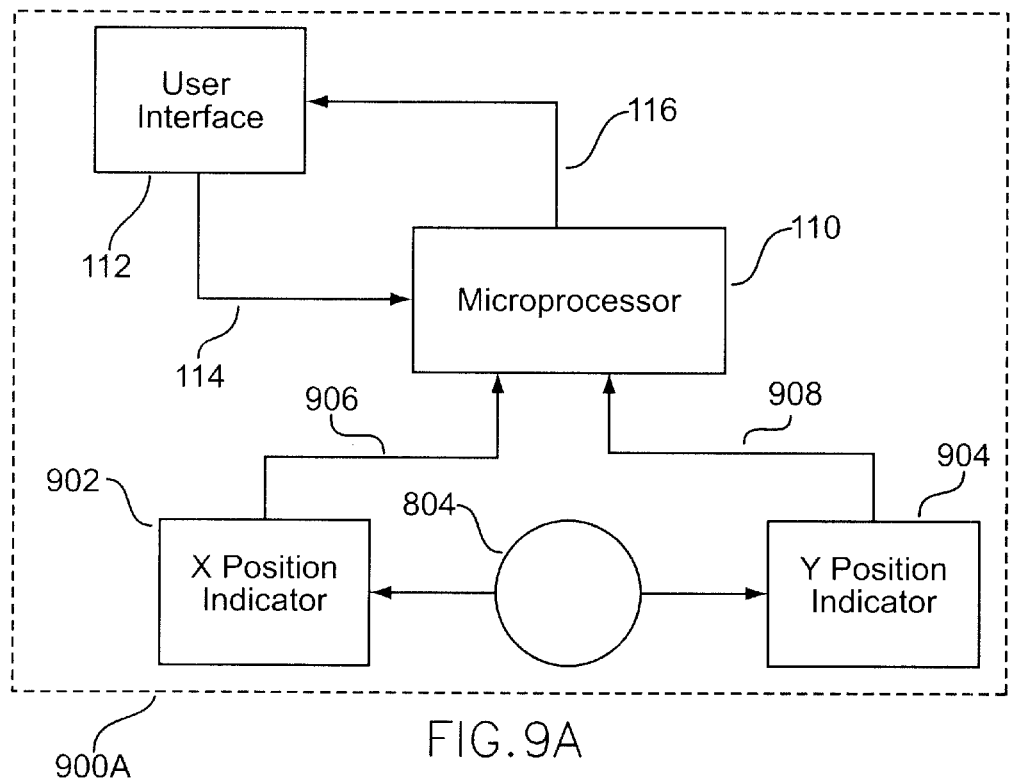
FIGS. 9A and 9B are block diagrams of two presently preferred area measurement systems for use with the area measurement device of FIGS. 8A and 8B.

FIGS. 9A is a block diagram of the area measurement system 900A used with the device 800 shown in FIGS. 8A and 8B. The system 900A includes X-Y position indicators 902, 904. The X-Y position indicators 902, 904 are configured to sense the rotation of the ball 804 about the X and Y axes. The X-Y position indicators 902, 904 replace the direction and distance indicators 102, 106 of the previous devices and send X-Y position data 906, 908 to the microprocessor 110. Using this information, the microprocessor 110 is programmed to map the boundary 402 onto a Cartesian coordinate system and to calculate the area inside the boundary 402 as described above.

With only X-Y position indicators 902, 904, this device must be maintained in a constant directional orientation as it is moved around the boundary 402. The constant directional orientation allows the X-Y position indicators 902, 904 to track the relative position of the device 800 as it is moved around the boundary 402. To avoid this limitation, a third position indicator may be added to the device 800 to track the directional orientation, as shown in the block diagram of FIG. 9B.

Figure 9B:
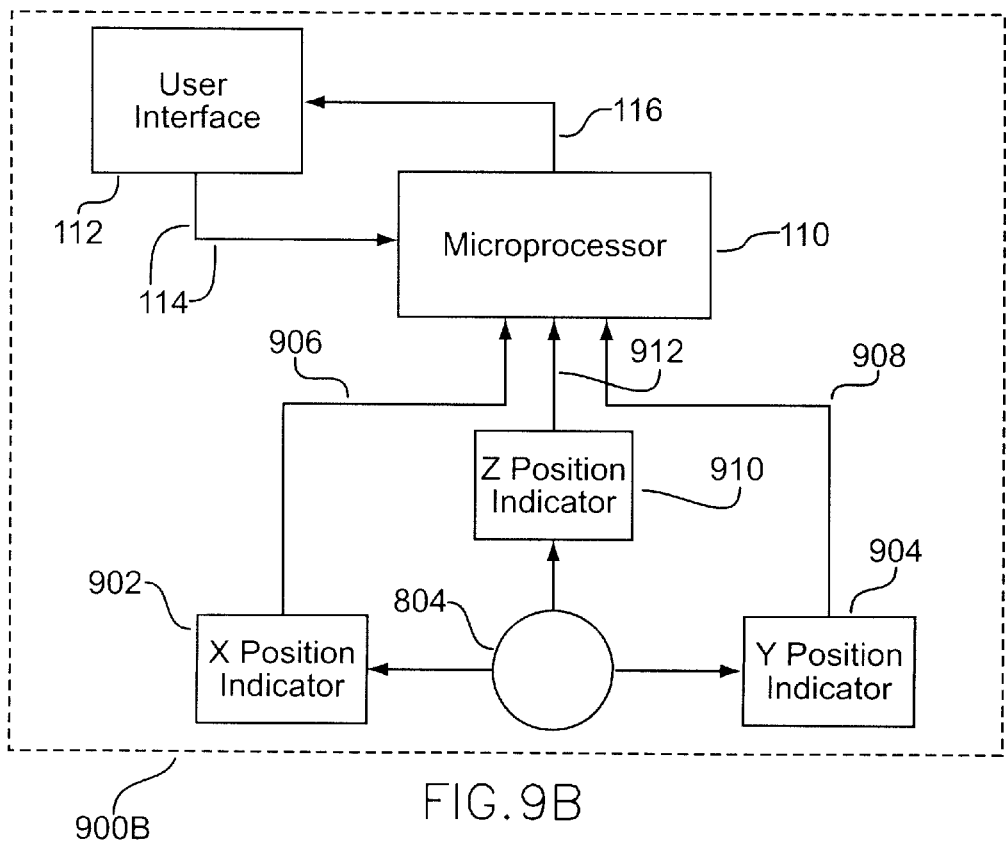

In FIG. 9B, a Z position indicator 910 may be configured to sense the rotation of the ball 804 about the Z axis. The Z axis is defined as perpendicular to the surface of the area being measured. The use of a Z position indicator 910 enables the system 900B to monitor the directional orientation of the device 800. In this case, it is not necessary to maintain a constant directional orientation while moving the device 800 around the boundary 402 because the system may be programmed to automatically take the directional orientation of the device 800 into account.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

What is claimed is:

1. A system for measuring an area inside a boundary, comprising:

a support to be moved around said boundary;

a direction indicator disposed on said support to determine a directional orientation of said support and create direction data;

a distance indicator disposed on said support to determine a distance traveled by said support and create distance data; and a microprocessor;

wherein said microprocessor is programmed to receive said direction and distance data and to calculate said area based on said direction and distance data.

2. A system for measuring an area inside a boundary as in claim 1, wherein:

said direction indicator is configured to determine said directional orientation on a periodic basis; and said distance indicator is configured to determine said distance traveled on a periodic basis.

3. A system for measuring an area inside a boundary as in claim 1, further comprising:

an input device adopted to communicate with said system and send instructions to said system.

4. A system for measuring an area inside a boundary as in claim 1, further comprising:

an output device adopted to communicate with said system and provide status information and measurement results.

5. A system for measuring an area inside a boundary as in claim 1, wherein:
said direction indicator comprises an electronic compass.

6. A system for measuring an area inside a boundary as in claim 1, wherein:
said direction indicator comprises a gyroscope.

7. A system for measuring an area inside a boundary as in claim 1, wherein said distance indicator comprises:
a wheel; and
a disc encoder;
wherein said disc encoder is configured to sense a rotational movement of said wheel, and to produce an electronic signal indicative of said rotational movement.

8. A system for measuring an area inside a boundary as in claim 1, wherein:
said microprocessor is a personal computer to which said direction and distance data are exported.

9. A system for measuring an area inside a closed boundary as in claim 1, wherein:
said microprocessor is a palm-sized computing device to which said direction and distance data are exported.

10. A system for measuring an area inside a boundary, comprising:
a support to be moved around said boundary;
a first wheel rotatably mounted on said support;
a second wheel rotatably mounted on said support coaxial with said first wheel;
a first distance indicator disposed on said support to determine a distance traveled by said first wheel and create first wheel distance data;
a second distance indicator disposed on said support to determine a distance traveled by said second wheel and create second wheel distance data; and
a microprocessor;
wherein said microprocessor is programmed to:
receive said first and second wheel distance data from said first and second wheel distance indicators;
compare said first and second wheel distance data to determine a directional orientation of said support and to create direction data; and
calculate said area based on said direction data and said first and second wheel distance data.

11. A system for measuring an area inside a boundary as in claim 10, further comprising:
an input device adopted to communicate with said system and send instructions to said system.

12. A system for measuring an area inside a boundary as in claim 10, further comprising:
an output device adopted to communicate with said system and provide status information and measurement results.

13. A system for measuring an area inside a boundary as in claim 10, wherein:
said microprocessor is a personal computer to which said first and second wheel distance data are exported.

14. A system for measuring an area inside a boundary as in claim 10, wherein:
said microprocessor is a palm-sized computing device to which said first and second wheel distance data are exported.

15. A system for measuring an area inside a boundary, comprising:
a rotatable ball to be moved around said boundary;
a support disposed on said ball;
X Y position indicators disposed on said support and adopted to convert the rotation of said ball into X Y position data indicative of X Y positions of said support;
a Z position indicator disposed on said support and adopted to convert the rotation of said ball into Z position data indicative of the directional orientation of said support; and
a microprocessor;
wherein said microprocessor is programmed to receive said position data and said Z position data and to calculate said area based on said position data.

16. A system for measuring an area inside a boundary as in claim 15, wherein:
said X Y position indicators convert said rotation of said ball into said X Y position data on a periodic basis.

17. A system for measuring an area inside a boundary as in claim 15, further comprising:
an input device adopted to communicate with said system and send instructions to said system.

18. A system for measuring an area inside a boundary as in claim 15, further comprising:
an output device adopted to communicate with said system and provide status information and measurement results.

19. A system for measuring an area inside a boundary as in claim 15, wherein:
said microprocessor is a personal computer to which said direction and distance data are exported.

20. A system for measuring an area inside a boundary as in claim 15, wherein:
said microprocessor is a palm sized computing device to which said direction and distance data are exported.

21. A method of measuring an area inside a boundary, comprising the steps of:
moving a support around said boundary;
determining a directional orientation of said support and a distance traveled by said support at a plurality of positions along said boundary;
creating direction data and distance data for each of said positions; and
calculating said area based on said direction and distance data.

22. A method of measuring an area inside a boundary as in claim 21, wherein said step of calculating said area further comprises the steps of:
using said direction and distance data to map a plurality of points representing said boundary onto a coordinate system;
dividing said coordinate system into a plurality of elements; and
determining a first number of said elements that are within said boundary represented by said plurality of points.

23. A method of measuring an area inside a boundary as in claim 22, further comprising the step of:
converting said direction and distance data from polar coordinates to rectangular coordinates.

24. A method of measuring an area inside a boundary as in claim 22, further comprising the step of:
quantizing each of said plurality of points to coincide with coordinates on said coordinate system.

25. A method of measuring an area inside a boundary as in claim 22, further comprising the steps of:

determining a starting point of said boundary;

determining an ending point of said boundary; and interpolating a portion of said boundary to connect said starting point to said ending point.

26. A method of measuring an area inside a boundary as in claim 22, wherein said step of determining a number of said elements that are within said boundary further comprises the steps of:

determining a maximum total area;

determining a second number of said elements that are within said maximum total area;

analyzing each of said second number of said elements to determine a third number of said elements that are within said maximum total area and not within said boundary represented by said plurality of points; and subtracting said third number from said second number.

27. A method of measuring an area inside a boundary as in claim 22, wherein said step of determining a maximum total area further comprises the steps of:

determining a maximum X value, a minimum X value, a maximum Y value, and a minimum Y value; and multiplying a difference between said maximum X value and said minimum X value by a difference between said maximum Y value and said minimum Y value.

28. A method of measuring an area inside a boundary as in claim 22, wherein:

said step of moving a support further comprises moving said support completely around said boundary.

29. A method of measuring an area inside a boundary as in claim 21, further comprising the steps of:

determining a starting point of said boundary;

determining an ending point of said boundary; and interpolating a portion of said boundary to connect said starting point to said ending point.

30. A method of measuring an area inside a boundary as in claim 21, further comprising the step of:

sending said direction and distance data to a microprocessor; and wherein said step of calculating said area is performed by said microprocessor.

31. A method of measuring an area inside a boundary as in claim 21, wherein:

said step of determining a directional orientation and a distance traveled is performed on a periodic basis.

32. A method of measuring an area inside a boundary, comprising the steps of:

moving a support around said boundary;

using a direction indicator to determine the directional orientation of said support and to create direction data;

using a distance indicator to determine the distance traveled by said support and to create distance data;

sending said direction and distance data to a microprocessor; and using said microprocessor to calculate said area based on said direction and distance data.

33. A method of measuring an area inside a boundary as in claim 32; wherein:

said direction and distance indicators are used to determine direction and distance data on a periodic basis.

* * * * *